United States Patent
Arunachalam et al.

(10) Patent No.: US 8,195,685 B2
(45) Date of Patent: Jun. 5, 2012

(54) SERVICE GROUPING AND ALLOCATION METHOD AND SYSTEM

(75) Inventors: Ravi Shankar Arunachalam, Bangalore (IN); Ahamed Jalaldeen, Karnataka (IN); Manoj Kumar Kejriwal, Bangalore (IN); Siddharth Narhariprasad Purohit, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 386 days.

(21) Appl. No.: 12/477,194

(22) Filed: Jun. 3, 2009

(65) Prior Publication Data
US 2010/0312781 A1 Dec. 9, 2010

(51) Int. Cl.
G06F 17/30 (2006.01)
(52) U.S. Cl. .................. 707/769; 709/201
(58) Field of Classification Search ........... 707/999.003, 707/769; 709/201
See application file for complete search history.

(56) References Cited

U.S. PATENT DOCUMENTS
2004/0153708 A1* 8/2004 Joshi et al. .................. 714/4
2006/0229925 A1 10/2006 Chalasani et al.
2007/0011126 A1* 1/2007 Conner et al. ............... 706/47
2007/0156430 A1 7/2007 Kaetker et al.
2007/0226222 A1 9/2007 Yamamoto et al.
2007/0226231 A1 9/2007 Venkat
2007/0245297 A1* 10/2007 Kuester et al. ............. 717/104
2008/0140760 A1 6/2008 Conner et al.

FOREIGN PATENT DOCUMENTS
WO WO2007041226 A2 4/2007

OTHER PUBLICATIONS
Non-Patent Literature "SOP Pattern (#5): Service Decomposition", pp. 1-6, published by InformIT on Apr. 2, 2009, written by Thomas Erl et al.*

* cited by examiner

Primary Examiner — Monica Pyo
(74) Attorney, Agent, or Firm — Schmeiser, Olsen & Watts; John Pivnichny

(57) ABSTRACT

A service grouping and allocation method and system. The method includes retrieving, by a computing system, a list of candidate services. The computing system retrieves service identification techniques data associated with the candidate services and identifies process elements associated with first candidate services of the candidate services. The first candidate services comprise a process decomposition service identification technique. It is determined if the computing system comprises first mapping data indicating relationships between the process elements and associated functional areas. The computing system generates and stores results data associated with the relationships.

19 Claims, 11 Drawing Sheets

SERVICE GROUPING AND ALLOCATION METHOD AND SYSTEM

FIELD OF THE INVENTION

The present invention relates to a method and associated system for grouping and allocating services.

BACKGROUND OF THE INVENTION

Arranging and modifying data typically comprises an inefficient process with little flexibility. Accordingly, there exists a need in the art to overcome at least some of the deficiencies and limitations described herein above.

SUMMARY OF THE INVENTION

The present invention provides a method comprising:
retrieving, by a computing system from a service oriented architecture (SOA) model, a list of candidate services;
retrieving, by said computing system, service identification techniques data associated with said candidate services;
identifying, by said computing system, process elements associated with first candidate services of said candidate services, wherein said first candidate services comprise a process decomposition service identification technique;
first determining, by a computer processor of said computing system, if said computing system comprises first mapping data indicating relationships between said process elements and first associated functional areas;
generating, by said computing system, results data of said first determining; and
storing, by said computing system, said results data.

The present invention provides a method comprising:
retrieving, by a computing system from a service oriented architecture (SOA) model, a list of exposed services;
identifying, by said computing system, candidate services associated with said exposed services;
retrieving, by said computing system, service identification techniques data associated with said candidate services;
identifying, by said computing system, process elements associated with first candidate services of said candidate services, wherein said first candidate services comprise a process decomposition service identification technique;
first determining, by a computer processor of said computing system, if said computing system comprises first mapping data indicating relationships between said process elements and first associated functional areas;
generating, by said computing system, results data associated with said first determining; and
storing, by said computing system, said results data.

The present invention advantageously provides a simple method and associated system capable of arranging and modifying data.

DETAILED DESCRIPTION OF THE INVENTION

Figure 1:
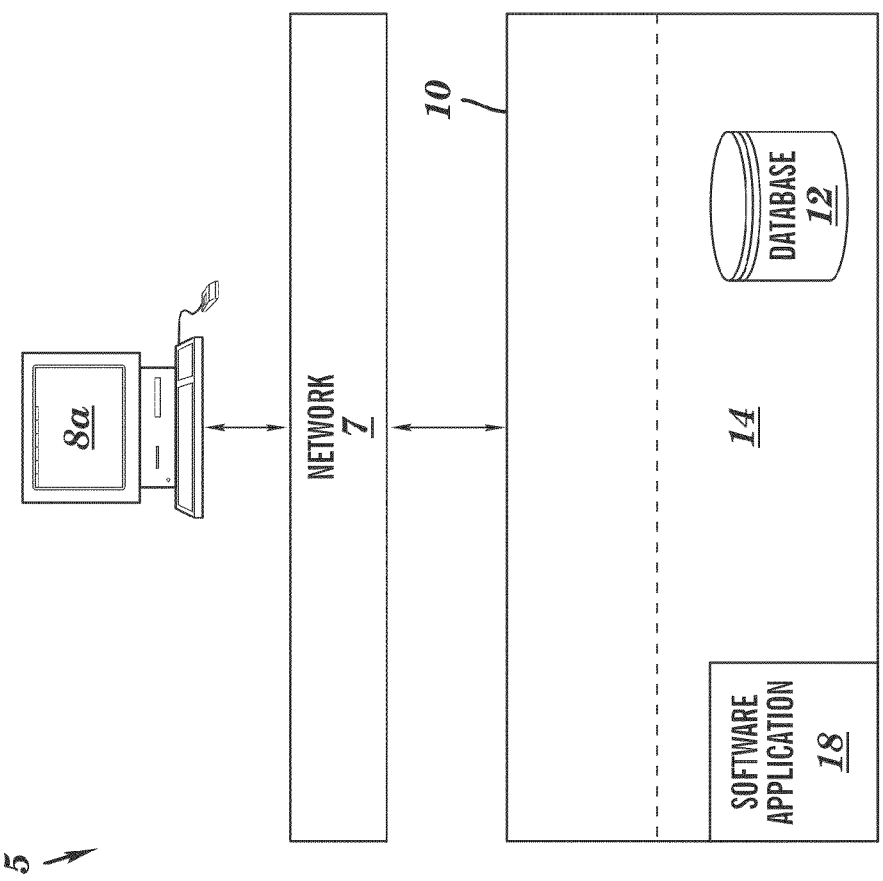
FIG. 1 illustrates a system for grouping and allocating services from a service oriented architecture (SOA) service model, in accordance with embodiments of the present invention.

FIG. 1 illustrates a system 5 for grouping and allocating services from a service oriented architecture (SOA) service model, in accordance with embodiments of the present invention. SOA comprises enterprise scale IT architecture for providing IT agility to support business agility. A service model is defined herein as an abstraction of IT services implemented within an enterprise that supports development of SOA solutions. A service model is used to conceive and document a design of software services. A service model comprises core elements of SOA and is used as an input for implementation activities. A candidate service is defined herein as a service is an early stage of a service life-cycle. For example, in a typical SOA project, there are several candidate services identified from various sources but only a portion or subset of the candidate services are transformed to real services. Real services are referred to as exposed services in a service life-cycle. An exposed service comprises a service qualified for exposure.

System 5 of FIG. 1 comprises a computing apparatus 8a connected to a computing system 10 through a network 7. Network 7 may comprise any type of network including, inter alia, a local area network, (LAN), a wide area network (WAN), the Internet, etc. Computing apparatus 8a may comprise any type of computing apparatus including, inter alia, a personal computer, a laptop computer, a computer terminal, etc. Computing apparatus 8a may comprise a single computing apparatus or a plurality of computing apparatuses. Computing apparatus 8a is used by end users for communicating with (e.g., entering data) computing system 10. Computing system 10 may comprise any type of computing system(s) including, inter alia, a personal computer (PC), a server computer, a database computer, etc. Computing system 10 is used to retrieve data from computing apparatus 8a for grouping and allocating services. Computing system 10 comprises a memory system 14. Memory system 14 may comprise a single memory system. Alternatively, memory system 14 may comprise a plurality of memory systems. Memory system 14 comprises a software application 18 and a database 12. Database 12 comprises all retrieved data (i.e., retrieved from computing apparatus 8a such as, inter alia, candidate services data, service identification techniques data, business process elements data, mapping data, service groups data, exposed services data, service components data, etc) and any generated data (e.g., results data, reports, etc). Although the term "business" is used throughout detailed description to describe various components of system 5, note that any term describing an organization may be used instead. For example, the term "business" may be replaced by, inter alia, the following terms: enterprise, entity, organization, group, etc. Alternatively, the term business may be removed from any of the components of system 5. For example, "business process elements data" may be referred to as a "process elements data".

Software application 18 performs the following functions associated with an automated process for grouping services:

1. Software application 18 retrieves all candidate services (i.e., data) from a current SOA model.

2. Software application 18 verifies service identification techniques of the candidate services. The verification process comprises retrieving service identification techniques data from the candidate services. Service identification techniques data comprises a name of a technique used to identify candidate services.

3. Software application 18 determines if a service identification technique of the service identification techniques data comprises a process decomposition technique. Process decomposition is defined herein as a service identification technique used to decompose business processes into smaller units and identify candidate services from the smaller units. If software application 18 determines that a service identification technique of the service identification techniques data does not comprise a process decomposition technique then a report indicating results of step 3 may be generated and step 9 is executed. If software application 18 determines that a service identification technique of the service identification techniques data comprises a process decomposition technique then step 4 is executed as described, infra.

4. Software application 18 identifies business process elements corresponding to the candidate services. A business process is defined herein as a collection of interrelated tasks for accomplishing a specific goal. A business process element may be a process, sub-process or task. Candidate services correspond to the business process elements.

5. Software application 18 verifies an existence of mapping data indicating relationships between business process elements and functional areas. A functional area is defined herein as a logical grouping of business capabilities (functionalities) that provide related business functions and require similar skills and expertise. A business is composed of domains. Domains are broken down (decomposed) into functional areas. Functional areas provide a set of cohesive business functions for a domain. A business component may be re-factored into one or more functional areas. If software application 18 finds an existence of mapping data indicating relationships between business process elements and functional areas, software application 18 groups a candidate service corresponding to a business process by a functional area and step 9 is executed. If software application 18 does not find an existence of mapping data indicating relationships between business process elements and functional areas then step 6 is executed as described as described, infra.

6. Software application 18 verifies an existence of mapping data indicating relationships between parent elements of a business process and a functional area. A parent element is defined herein as a business process element that comprises current process elements as sub-elements. If software application 18 finds an existence of mapping data indicating relationships between a parent element of the business process element and functional areas, software application 18 groups a candidate service corresponding to the business process element by the functional area and step 9 is executed as described, infra. If software application 18 does not find an existence of mapping data indicating relationships between a parent element of the business process element and functional areas then step 7 is executed as described, infra.

7. Software application 18 verifies an existence of mapping data indicating relationships between business process element and business component. A business component is defined herein as a logical portion of an enterprise that includes resources, processes, people, services, and technology necessary to deliver value to the enterprise. If software application 18 finds an existence of mapping data indicating relationships between a business process element and a business component, then software application 18 groups the candidate service corresponding to the business process element by the business component and step 9 is executed as described, infra. If software application 18 does not find an existence of mapping data indicating relationships between a business process element and a business component then step 8 is executed as described, infra.

8. Software application 18 verifies an existence of mapping data indicating relationships between a parent element of a business process element and business components. If software application 18 finds an existence of mapping data indicating relationships between a parent element of a business process element and business components, then software application 18 groups a candidate service corresponding the business process element by business components. If software application 18 does not find an existence of mapping data indicating relationships between a parent element of a business process element and a business component then step 9 is executed as described, infra.

9. Software application 18 determines if more candidate services require processing. If software application 18 determines that more candidate services require processing then step 2 is repeated otherwise the process is terminated.

The following examples illustrate implementation scenarios for grouping services:

Example 1

1. Business process model elements (e.g., see business process model elements in FIG. 7, infra) are mapped with corresponding business components (e.g., see business components in FIG. 6, infra) in a component business model (CBM). A CBM comprises business competencies, business components, and business services that together describe an enterprise or industry. In this example, a granularity of business components and functional areas comprise a one-to-one relationship.
  A. Business component: Account & policy administration.
  B. Business processes: Manage accounts, open account, process transactions, close account.

2. An SOA architect identifies the following candidate services (e.g., see candidate services in FIG. 8, infra) from process models:
  A. Candidate services: Manage accounts, open account, process transactions, close account.

3. The SOA architect identifies the following candidate service from additional sources (e.g., from an information model).
  A. Candidate service: Account.

Figure 9:
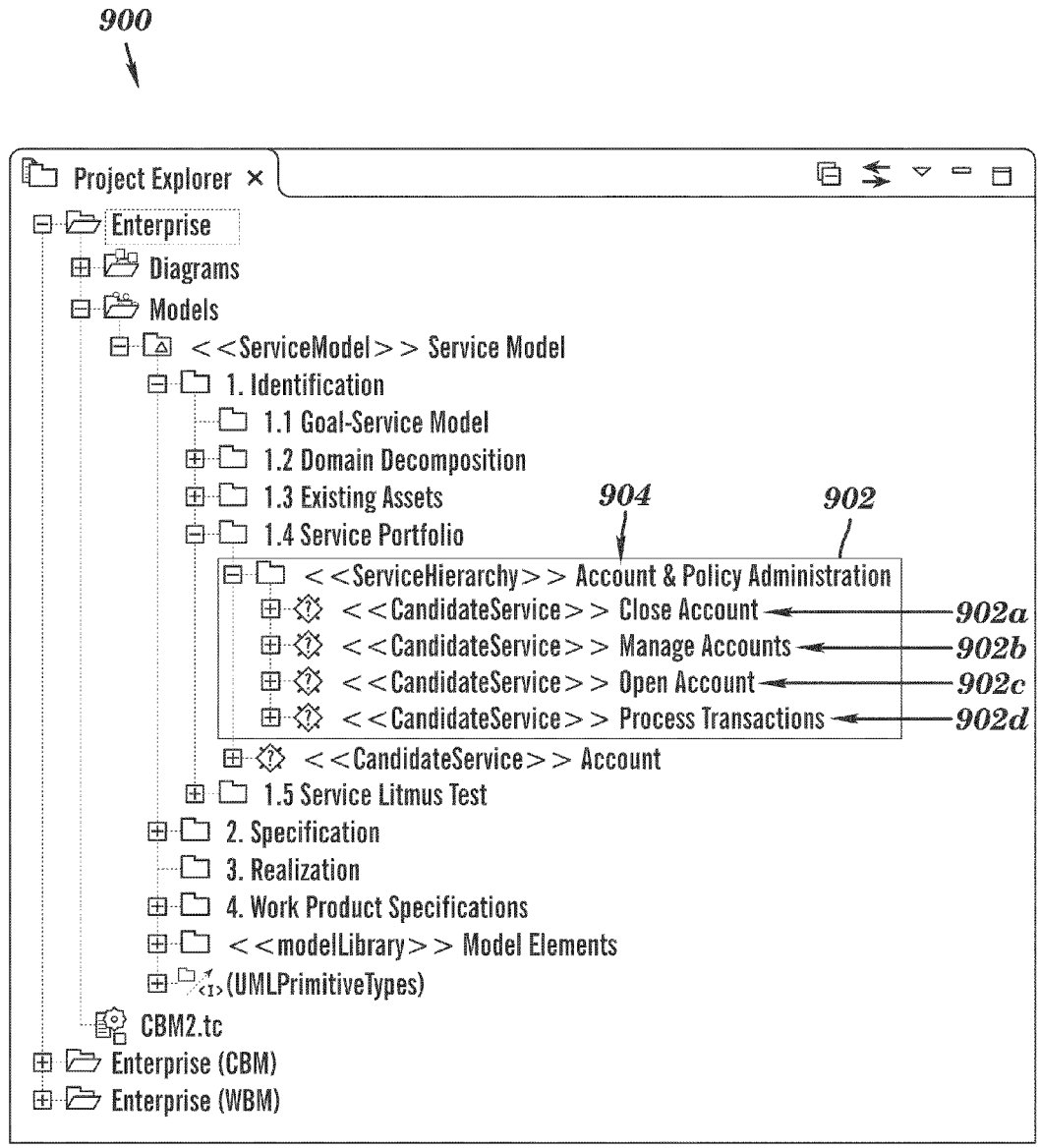
FIG. 9 illustrates a screen shot of candidate services moved under a service group, in accordance with embodiments of the present invention.

4. The SOA architect invokes a user interface for automated service grouping.
5. A computing system (e.g., computing system 10 in FIG. 1) retrieves all of the following candidate services in the current SOA model:
   A. Candidate services: manage accounts, open account, process transactions, close account, account.
6. The computing system processes every candidate service.
7. The computing system retrieves candidate services with process decomposition as a service identification technique the remaining candidate services are ignored: manage accounts, open account, process transactions, close account.
8. The computing system identifies business process elements (process, sub-process or task) corresponding to the following candidate services:
   A. Candidate service: manage accounts, process: manage accounts.
   B. Candidate service: open account, sub-process: open account.
   C. Candidate service: process transactions, sub-process: process transactions.
   D. Candidate service: close account, sub-process: close account.
9. The computing system verifies existence of mapping data from the following business process elements (process, sub-process or task) to a functional area:
   A. Process: manage accounts is not mapped to a functional area.
   B. Sub-process: open account is not mapped to a functional area.
   C. Sub-process: process transactions is not mapped to a functional area
   D. Sub-process: close account is not mapped to a functional area.
10. The computing system verifies the existence of mapping data from the following parent elements of the business process element (process, sub-process or task) to the functional area.
   A. Process: manage accounts, parent elements are not mapped to the functional area
   B. Sub-process: open account, parent elements are not mapped to the functional area.
   C. Sub-process: process transactions, parent elements are not mapped to the functional area.
   D. Sub-process: close account, parent elements are not mapped to the functional area.
11. The computing system verifies the existence of mapping data from the following business process elements (process, sub-process or task) to a business component.
   A. Process: manage accounts, business component: account & policy administration.
   B. Sub-process: open account, is not mapped to the business component.
   C. Sub-process: process transactions is not mapped to a business component.
   D. Sub-process: close account is not mapped to the business component.
12. The computing system verifies the existence of mapping data from the following parent elements of the business process (process, sub-process or task) to a business component.
   A. Sub-process: open account, parent element is mapped to an account & policy administration business component.
   B. Sub-process: process transactions, parent element is mapped to an account & policy administration business component.
   C. Sub-process: close account, parent element is mapped to an account & policy administration business component.
13. The computing system moves the service under a service group corresponding to the business component (e.g., as illustrated in FIG. 9, infra).
   A. Service group: account & policy administration.
   B. Candidate services: manage accounts, open account, process transactions, close account.

Example 2

Figure 10:
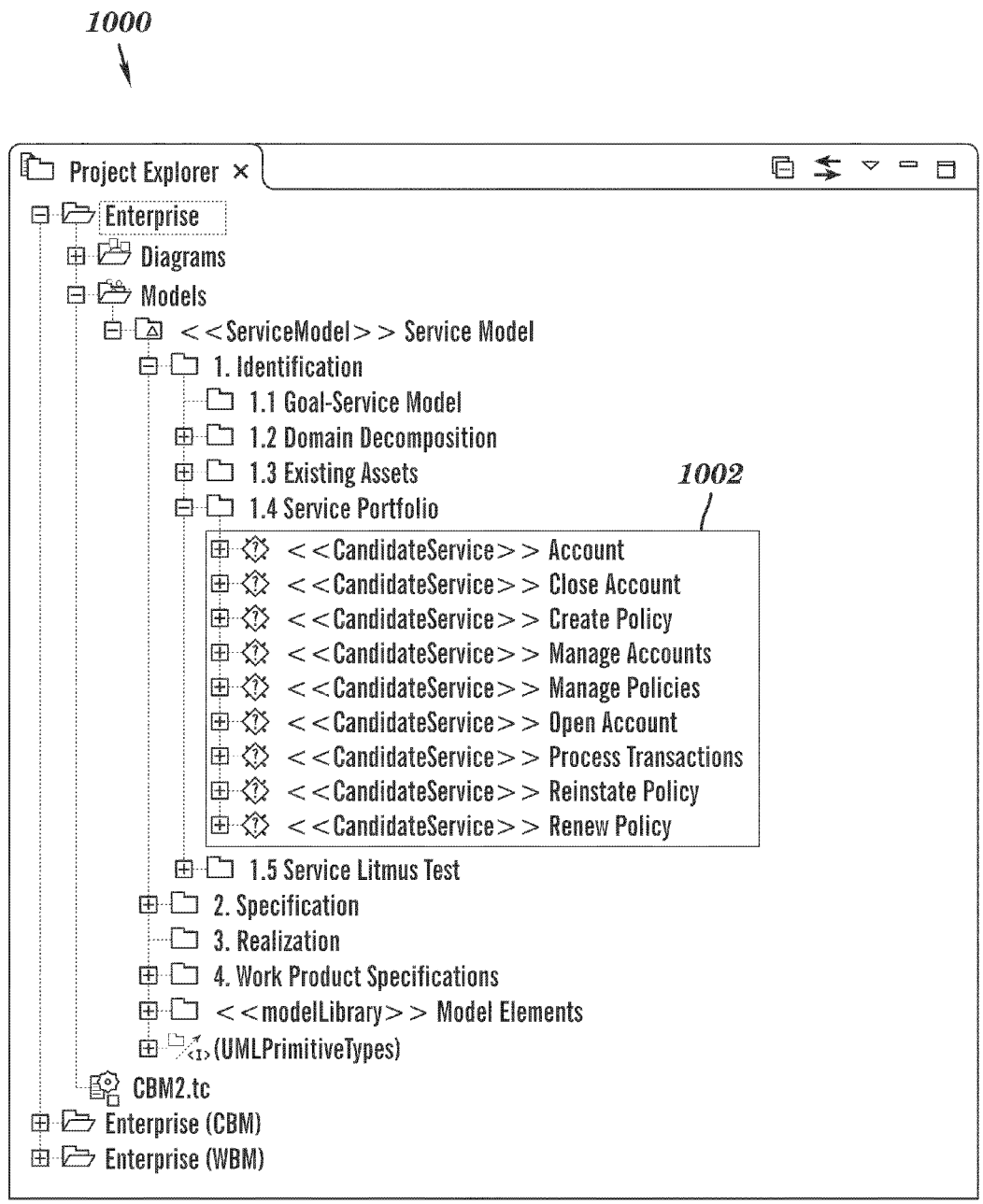
FIG. 10 illustrates a second screen shot of candidate services, in accordance with embodiments of the present invention.

1. 1. In this example, a granularity of business components and functional areas comprise a one-to-many relationship.
   A. Business component: account & policy administration.
   B. Business processes: manage accounts, open account, process transactions, close account, manage policies, create policy, renew policy, and reinstate policy.
2. An SOA architect: creates the following functional areas from business components, maps business processes to functional areas, and identifies candidate services from process models.
   A. Business component: account & policy administration.
   B. Functional areas: account administration, policy administration.
   C. Business processes: manage accounts, open account, process transactions, close account are mapped to an account administration functional area.
   D. Business processes: manage policies, create policy, renew policy, and reinstate policy are mapped to a policy administration functional area.
   E. Candidate services: manage accounts, open account, process transactions, close account, manage policies, create policy, renew policy, reinstate policy (e.g., as illustrated in FIG. 10, infra).
3. The SOA architect: identifies the following candidate services from additional sources (e.g., from an information model).
   A. Candidate service: account (e.g., as illustrated in FIG. 10, infra).
4. The SOA architect invokes automated service grouping through a user interface.
5. A computing system (e.g., computing system 10 of FIG. 1) retrieves all of the following candidate services in the current SOA model.
   A. Candidate service: manage accounts, open account, process transactions, close account, manage policies, create policy, renew policy, reinstate policy, account.
6. The computing system processes every candidate service.
7. The computing system retrieves candidate services with a service identification technique of process decomposition and remaining candidate services are ignored: manage accounts, open account, process transactions, close account, manage policies, create policy, renew policy, reinstate policy.
8. The computing system identifies business process elements (process, sub-process or task) corresponding to the following candidate services.
   A. Candidate service: manage accounts, process: manage accounts.
   B. Candidate service: open account, sub-process: open account.
   C. Candidate service: process transactions, sub-process: process transactions.
   D. Candidate service: close account, sub-process: close account.
   E. Candidate service: manage policies, process: manage policies.

F. Candidate service: create policy, sub-process: create policy.
G. Candidate service: renew policy, sub-process: renew policy.
H. Candidate service: reinstate policy, sub-process: reinstate policy.

9. The computing system verifies the existence of mapping data from the following business process elements (process, sub-process or task) to a functional area.
   A. Process: manage accounts mapped to an account administration functional area.
   B. Sub-process: open account is not mapped to a functional area.
   C. Sub-process: process transactions is not mapped to a functional area.
   D. Sub-process: close account is not mapped to functional area.
   E. Process: manage policies is mapped to a policy administration functional area.
   F. Sub-process: create policy is not mapped to a functional area.
   G. Sub-process: renew policy is not mapped to a functional area.
   H. Sub-process: reinstate policy is not mapped to a functional area.

10. The computing system verifies the existence of mapping data from parent elements of the following business processes (process, sub-process or task) to a functional area.
    A. Sub-process: open account, parent element is mapped to "account administration" functional area.
    B. Sub-process: process transactions, parent element is mapped to an account administration functional area.
    C. Sub-process: close account, parent element is mapped to an account administration functional area.
    D. Sub-process: create policy, parent element is mapped to a policy administration functional area.
    E. Sub-process: renew policy, parent element is mapped to a policy administration functional area.
    F. Sub-process: reinstate policy, parent element is mapped to a policy administration functional area.

11. The computing system moves the following services under a service group corresponding to the functional area.
    A. Service group 1: account administration.
    B. Candidate services: manage accounts, open account, process transactions, close account.
    C. Service group 2: policy administration.
    D. Candidate services: manage policies, create policy, renew policy, reinstate policy.

Software application 18 performs the following functions associated with an automated process for allocating services:

1. Software application 18 retrieves all exposed services (i.e., data) from a current SOA model.
2. Software application 18 identifies candidate services associated with the exposed services.
3. Software application 18 verifies service identification techniques of the candidate services. The verification process comprises retrieving service identification techniques data from the candidate services. Service identification techniques data comprises a technique used to identify candidate services.
4. Software application 18 determines if a service identification technique of the service identification techniques data comprises a process decomposition technique. If software application 18 determines that a service identification technique of the service identification techniques data does not comprise a process decomposition technique then a report indicating results of step 4 may be generated and step 2 is repeated. If software application 18 determines that a service identification technique of the service identification techniques data comprises a process decomposition technique then step 5 is executed as described, infra.
5. Software application 18 identifies business process elements corresponding to the candidate services. The candidate services correspond to the business process elements.
6. Software application 18 finds an existence of mapping data indicating relationships between business process elements and functional areas. If software application 18 verifies an existence of mapping data indicating relationships between business process elements and functional areas, software application 18 allocates the exposed services with associated service components corresponding to the functional areas and step 2 is repeated. If software application 18 does not find an existence of mapping data indicating relationships between business process elements and functional areas then step 7 is executed as described, infra.
7. Software application 18 verifies an existence of mapping data indicating relationships between a parent element of the business process element and functional area. If software application 18 finds an existence of mapping data indicating relationships between a parent element of the business process element and the functional area, software application 18 allocates the exposed service with an associated service component corresponding to the functional area and step 2 is repeated. If software application 18 does not find existence of mapping data indicating relationships between a parent element of the business process element and the functional area then step 8 is executed as described, infra.
8. Software application 18 verifies an existence of mapping data indicating relationships between a business process element and a business component. If software application 18 finds an existence of mapping data indicating relationships between a business process element and a business component, then software application 18 allocates the exposed service with an associated service component corresponding to the business component and step 2 is repeated. If software application 18 does not find an existence of mapping data indicating relationships between a business process element and a business component then step 9 is executed as described, infra.
9. Software application 18 verifies an existence of mapping data indicating relationships between a parent element of the business process element and a business component. If software application 18 finds existence of mapping data indicating relationships between a parent element of the business process element and a business component, then software application 18 allocates the exposed service with an associated service component corresponding to the business component and step 2 is repeated. If software application 18 does not find an existence of mapping data indicating relationships between a parent element of the business process element and the business component then step 2 is repeated.

The following examples illustrate implementation scenarios for allocating services:

Example 3

1. Business process model elements are mapped with corresponding business components in a CBM. In this example, a granularity of business components and functional areas comprise a one-to-one relationship.
   A. Business component: Account & policy administration.
   B. Business processes: Manage accounts, open account, process transactions, close account.

2. An SOA architect identifies candidate services from process models, exposes some of the candidate services as real services, creates subsystems from functional areas, and creates service components.
   A. Candidate services: manage accounts, open account, process transactions, close account.
   B. Exposed services: manage accounts, process transactions.
   C. Functional area: account & policy administration.
   D. Subsystem: account & policy administration.
   E. Service component: account & policy administration.
3. The SOA architect invokes an automated service component allocation algorithm through a user interface.
4. A computing system (e.g., computing system 10) retrieves all of the following exposed services in the SOA service model.
   A. Exposed services: manage accounts, process transactions.
5. The computing system processes every exposed service.
6. The computing system identifies a candidate service corresponding to all of the following exposed services.
   A. Exposed services: manage accounts, candidate service: manage accounts.
   B. Exposed services: process transactions, candidate service: process transactions.
7. The computing system retrieves a candidate service with process decomposition as a service identification technique and the remaining candidate services are ignored: manage accounts, process transactions.
8. The computing system identifies business process elements (process, sub-process or task) corresponding to the following candidate services:
   A. Candidate service: manage accounts, process: manage accounts.
   B. Candidate service: process transactions, sub-process: process transactions.
9. The computing system verifies an existence of mapping data from business process elements (process, sub-process or task) to a functional area.
   A. Process: manage accounts is not mapped to a functional area.
   B. Sub-process: process transactions is not mapped to the functional area.
10. The computing system verifies the existence of mapping data from parent elements of a business process element (process, sub-process or task) to a functional area.
    A. Process: manage accounts, parent elements are not mapped to the functional area.
    B. Sub-process: process transactions, parent elements are not mapped to the functional area.
11. The computing system verifies an existence of mapping data from business process elements (process, sub-process or task) to a business component.
    A. Process: manage accounts, business component: account & policy administration.
    B. Sub-process: process transactions are not mapped to the business component.
12. The computing system verifies an existence of mapping data from parent elements of a business process element (process, sub-process or task) to a business component.
    A. Sub-process: process transactions, parent element is mapped to an account & policy administration business component
13. The computing system allocates the exposed service to a service component corresponding to the business component.
    A. Service component: account & policy administration.
    B. Exposed services: manage accounts, process transactions.

Example 4

1. Business process model elements are mapped with corresponding business components in a CBM. In this example, a granularity of business components, functional areas, subsystems, and service components are not the same.
   A. Business component: account & policy administration.
   B. Business processes: manage accounts, open account, process transactions, close account, manage policies, create policy, renew policy, reinstate policy.
2. An SOA architect: creates functional areas from business components, maps business processes to functional areas, identifies candidate services from process models, exposes some of the candidate services as real services, creates subsystems from functional areas, and creates service components.
   A. Functional areas: account administration, policy administration.
   B. Business processes: manage accounts, open account, process transactions, and close account are mapped to an account administration functional area.
   C. Business processes: manage policies, create policy, renew policy, reinstate policy are mapped to a policy administration functional area.
   D. Candidate services: manage accounts, open account, process transactions, close account, manage policies, create policy, renew policy, reinstate policy.
   E. Exposed services: manage accounts, process transactions, manage policies, renew policy.
   F. Subsystems: account administration, policy administration.
   G. Service components: account administration, policy administration.
3. The SOA architect invokes an automated service component allocation algorithm through a user interface.
4. A computing system retrieves all exposed services in the SOA model.
   A. Exposed services: manage accounts, process transactions, manage policies, renew policy.
5. The computing system identifies a candidate service corresponding to every exposed service.
   A. Exposed service: manage accounts, candidate service: manage accounts.
   B. Exposed service: process transactions, candidate service: process transactions.
   C. Exposed service: manage policies, candidate service: manage policies.
   D. Exposed service: renew policy, candidate service: renew policy.
6. The computing system retrieves candidate services with process decomposition as a service identification technique and the remaining candidate services are ignored.
   A. Candidate services: manage accounts, process transactions, manage policies, renew policy
7. The computing system identifies a business process element (process, sub-process or task) corresponding to the candidate services.
   A. Candidate service: manage accounts, process: manage accounts.
   B. Candidate service: process transactions, sub-process: process transactions.
   C. Candidate service: manage policies, process: manage policies.

D. Candidate service: renew policy, sub-process: renew policy.
8. The computing system verifies an existence of mapping data from business process elements (process, sub-process or task) to a functional area.
   A. Process: manage accounts is mapped to an account administration functional area.
   B. Sub-process: process transactions is not mapped to a functional area.
   C. Process: manage policies is mapped to a policy administration functional area.
   D. Sub-process: renew policy is not mapped to a functional area.
9. The computing system verifies the existence of mapping data from parent elements of a business process element (process, sub-process or task) to a functional area.
   A. Sub-process: process transactions, parent element is mapped to an account administration functional area.
   B. Sub-process: renew policy, parent element is mapped to a policy administration functional area.
10. The computing system allocates the exposed services to service components corresponding to the functional area.
    A. Service component: account administration.
    B. Exposed services: manage accounts, process transactions.
    C. Service component: policy administration.
    D. Exposed services: manage policies, renew policy.

Figure 2:
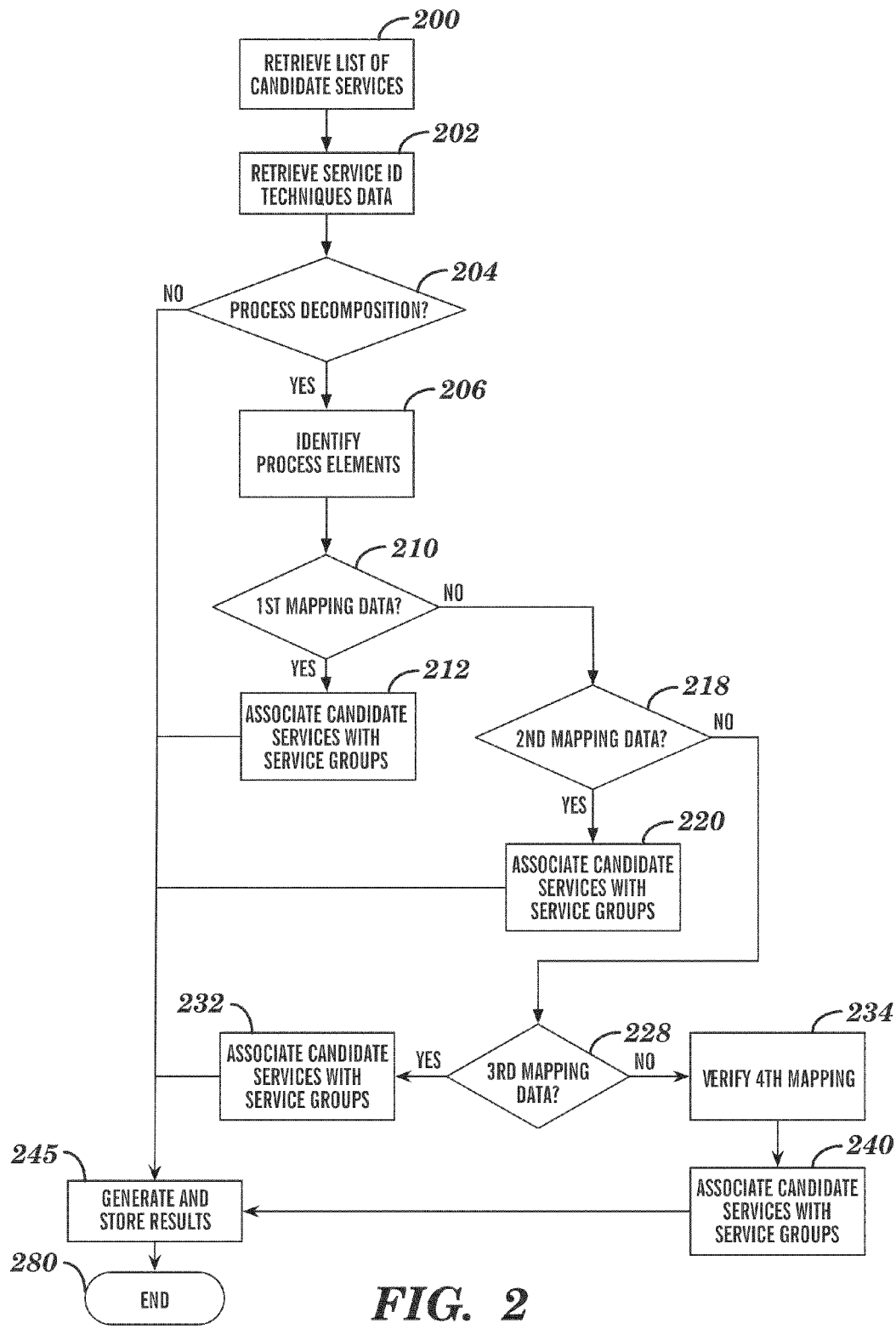
FIG. 2 illustrates a flowchart describing an algorithm used by the system of FIG. 1 for grouping services from a SOA service model, in accordance with embodiments of the present invention.

FIG. 2 illustrates a flowchart describing an algorithm used by system 5 of FIG. 1 for grouping services from a service oriented architecture (SOA) service model, in accordance with embodiments of the present invention. In step 200, a computing system (e.g., computing system 10 of FIG. 1) retrieves (i.e., from an SOA model) a list of candidate services. In step 202, the computing system retrieves service identification techniques data associated with the candidate services. In step 202, the computing system determines if service identification techniques data comprises process decomposition as a service identification technique. If in step 202, the computing system determines that the service identification techniques data does not comprise process decomposition as a service identification technique then in step 245 a report indicating results of step 204 is generated and stored and the process is terminated in step 280. If in step 202, the computing system determines that the service identification techniques data does comprise process decomposition as a service identification technique then in step 206, the computing system identifies process elements associated with the candidate services. In step 210, the computing system determines an existence of first mapping data indicating relationships between the process elements and first associated functional areas. If in step 210, the computing system determines the existence of the first mapping data then in step 212, the computing system associates the candidate services with service groups associated with the first associated functional areas and in step 245 a report indicating results of step 212 is generated and stored and the process is terminated in step 280. If in step 210, the computing system does not determine the existence of the first mapping data then in step 218, the computing system determines an existence of second mapping data indicating relationships between parent elements of the process elements and second associated functional areas. If in step 218, the computing system determines the existence of the second mapping data then in step 220, the computing system associates the candidate services with service groups associated with the second associated functional areas and in step 245 a report indicating results of step 220 is generated and stored and the process is terminated in step 280. If in step 218, the computing system does not determine the existence of the second mapping data then in step 228, the computing system determines an existence of third mapping data indicating relationships between the process elements and first associated business components. If in step 228, the computing system determines the existence of the third mapping data then in step 232, the computing system associates the candidate services with service groups associated with the first associated business components and in step 245 a report indicating results of step 232 is generated and stored and the process is terminated in step 280. If in step 228, the computing system does not determine the existence of the third mapping data then in step 234, the computing system determines that fourth mapping data exists. The fourth mapping data indicates relationships between the parent elements of the process elements and second associated business components. In step 240, the computing system associates the candidate services with service groups associated with the first associated business components. In step 245 a report indicating results of step 240 is generated and stored and the process is terminated in step 280.

Figure 3:
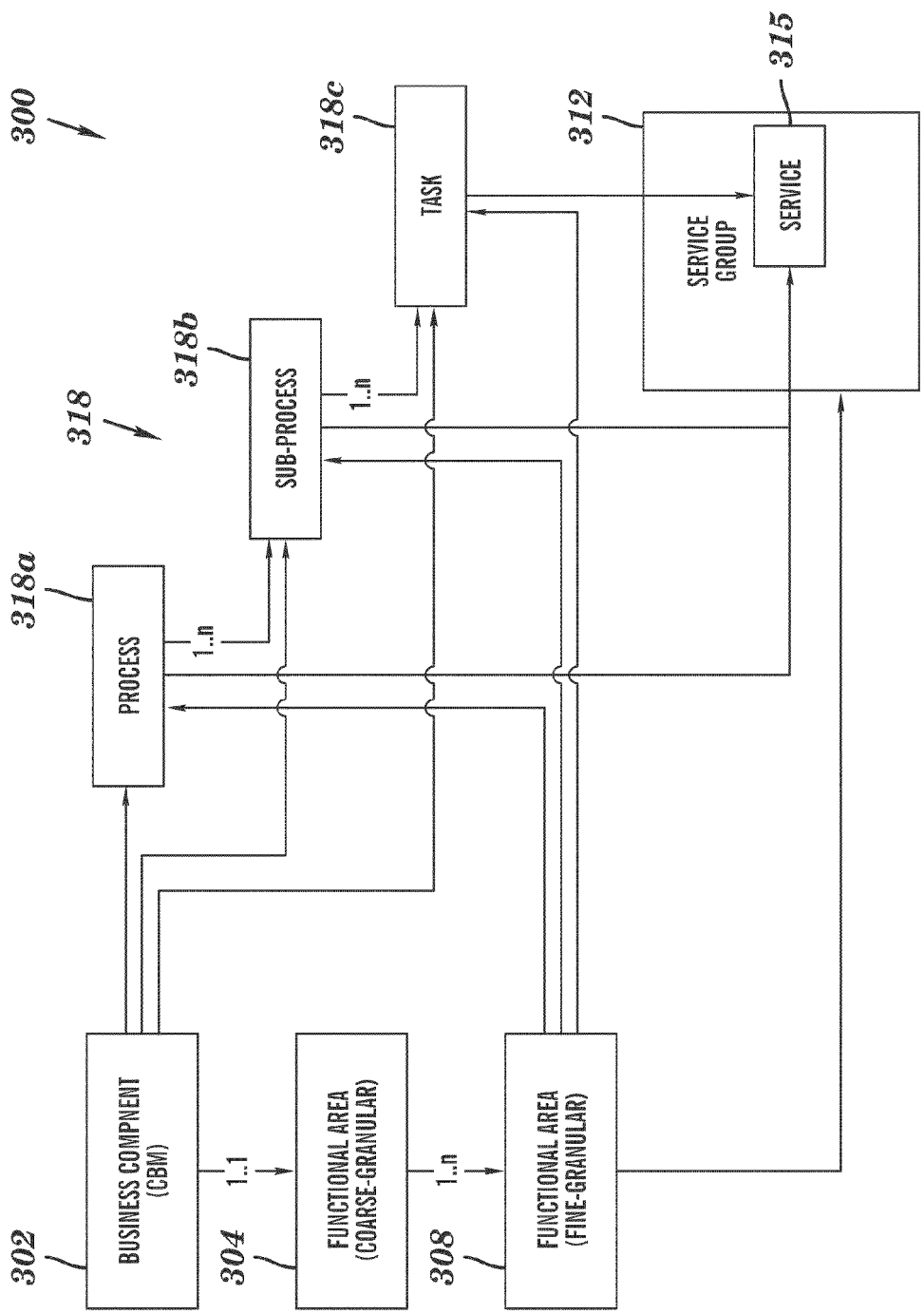
FIG. 3 illustrates a block diagram for implementing the system of FIG. 1 for grouping services, in accordance with embodiments of the present invention.

FIG. 3 illustrates a block diagram 300 for implementing system 5 of FIG. 1 for grouping services, in accordance with embodiments of the present invention. A business component 302 in a CBM map may be considered as a coarse-granular functional area 304 (i.e., a one-to-one relationship between business component 302 and a coarse-granular functional area 304). Coarse-granular functional area 304 may be decomposed into multiple fine-granular functional areas 308 (i.e., a one-to-many relationship between coarse-granular functional areas 308 and fine-granular functional area 304). Business processes 318 (i.e., comprising process 318a, sub-process 318b, and task 318c) may be mapped to a corresponding business component. Business processes 318 may be mapped to a corresponding functional area and the mapping may be used to group 312 the services 315.

Figure 4:
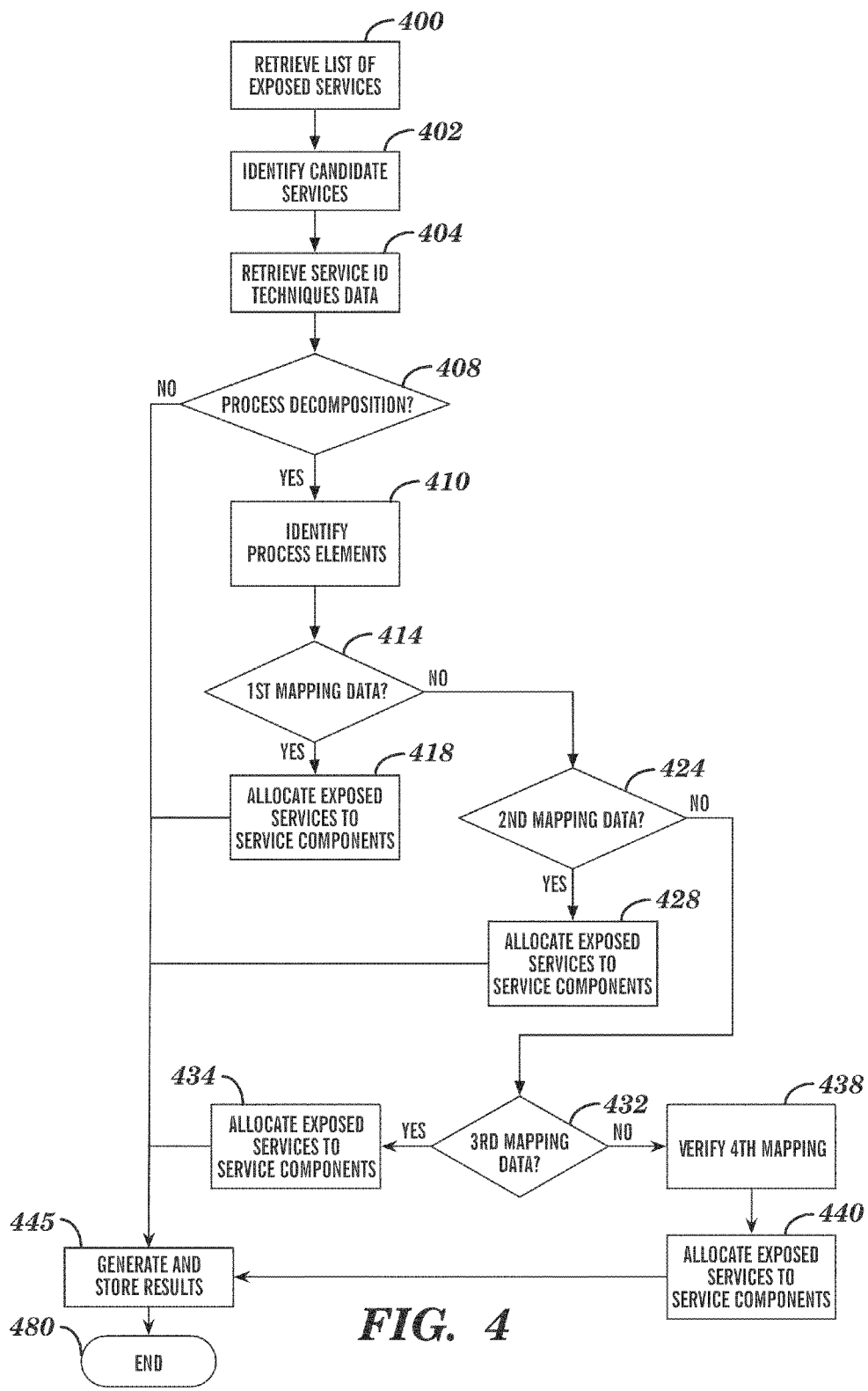
FIG. 4 illustrates a flowchart describing an algorithm used by the system of FIG. 1 for allocating services from a SOA service model, in accordance with embodiments of the present invention.

FIG. 4 illustrates a flowchart describing an algorithm used by system 5 of FIG. 1 for allocating services from a service oriented architecture (SOA) service model, in accordance with embodiments of the present invention. In step 400, a computing system (e.g., computing system 10 of FIG. 1) retrieves (i.e., from an SOA model) a list of candidate services. In step 402, the computing system identifies candidate services associated with the exposed services. In step 404, the computing system retrieves service identification techniques data associated with the candidate services. In step 406, the computing system determines if service identification techniques data comprises process decomposition as a service identification technique. If in step 406, the computing system determines that the service identification techniques data does not comprise process decomposition as a service identification technique then in step 445 a report indicating results of step 408 is generated and stored and the process is terminated in step 480. If in step 408, the computing system determines that the service identification techniques data comprises process decomposition as a service identification technique then in step 410, the computing system identifies process elements associated with the candidate services. In step 414, the computing system determines an existence of first mapping data indicating relationships between the process elements and first associated functional areas. If in step 414, the computing system determines the existence of the first mapping data then in step 418, the computing system allocates the exposed services to service components associated with the first associated functional areas and in step 445 a report indicating results of step 418 is generated and stored and the process is terminated in step 480. If in step 414, the computing system does not determine the existence of the first mapping data then in step 424, the computing system determines an existence of second mapping data indicating relationships between parent elements of the process elements and second associated functional areas. If in step 424, the computing system determines the existence of the second mapping data then in step 428, the computing system allocates the exposed services to service components associated with the second associated functional areas and in step 445 a report indicating results of step 428 is generated and stored and the process is terminated in step 480. If in step 424, the computing system does not determine the existence of the second mapping data then in step 432, the computing system determines an existence of third mapping data indicating relationships between the process elements and first associated business components. If in step 432, the computing system determines the existence of the third mapping data then in step 434, the computing system allocates the exposed services to service components associated with the first associated business components and in step 445 a report indicating results of step 434 is generated and stored and the process is terminated in step 480. If in step 432, the computing system does not determine the existence of the third mapping data then in step 438, the computing system determines that fourth mapping data exists. The fourth mapping data indicates relationships between the parent elements of the process elements and second associated business components. In step 440, the computing system allocates the exposed services to service components associated with the first associated business components. In step 445, a report indicating results of step 440 is generated and stored and the process is terminated in step 480.

Figure 5:
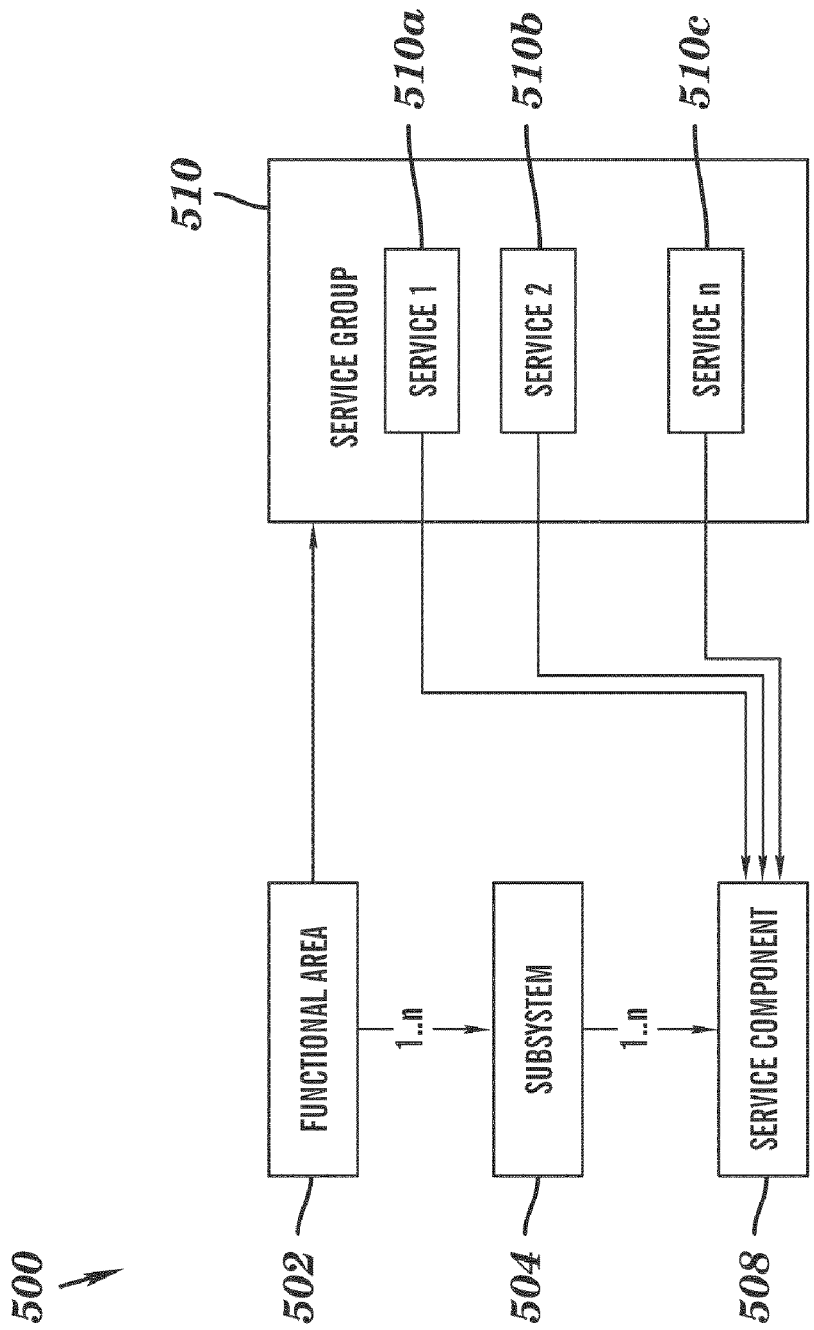
FIG. 5 illustrates a block diagram for implementing the system of FIG. 1 for allocating services, in accordance with embodiments of the present invention.

FIG. 5 illustrates a block diagram 500 for implementing system 5 of FIG. 1 for allocating services, in accordance with embodiments of the present invention. If a granularity of a functional area 502 and a subsystem 504 are the same (i.e., subsystem 504 has single service component comprising a one-to-one relationship between functional area 502, subsystem 504, and service component 508) an allocation of services 510a . . . 510c in a service group 510 to service component 508 is fully automated. If a granularity of functional area 502 and subsystem 504 are not the same (i.e., subsystem 504 has multiple service components comprising a one-to-many relationship between functional area 502, subsystem 504, and service component 508) an allocation of services 510a . . . 510c in service group 510 to service component 508 is partially automated.

Figure 6:
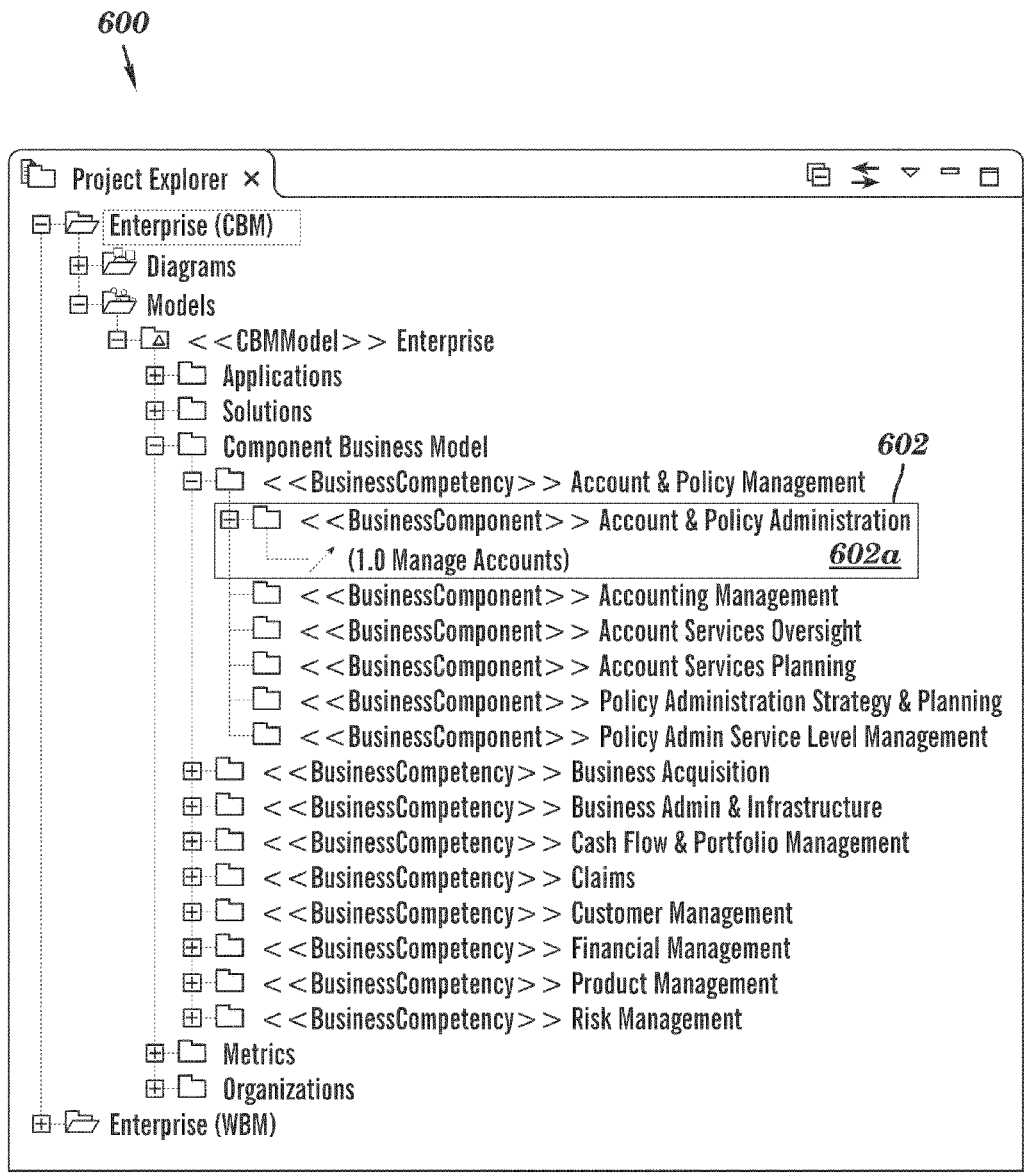
FIG. 6 illustrates a screen shot of a business component, in accordance with embodiments of the present invention.

FIG. 6 illustrates a screen shot 600 of a business component 602 comprising an account & policy administration component 602a, in accordance with embodiments of the present invention.

Figure 7:
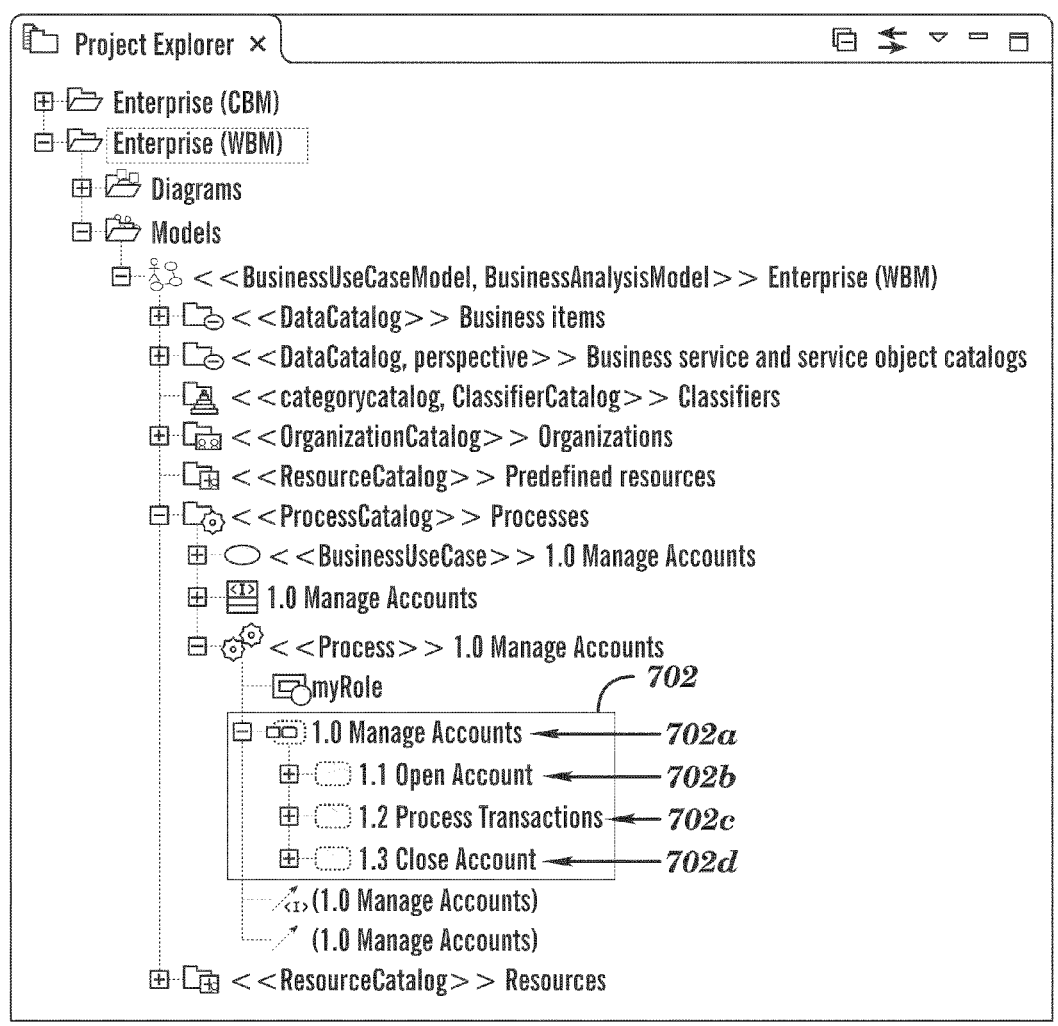
FIG. 7 illustrates a screen shot of processes, in accordance with embodiments of the present invention.

FIG. 7 illustrates a screen shot 700 of business processes 702 comprising a manage accounts process 702a, an open account process 702b, a transactions process 702c, and a close account process 702d, in accordance with embodiments of the present invention.

Figure 8:
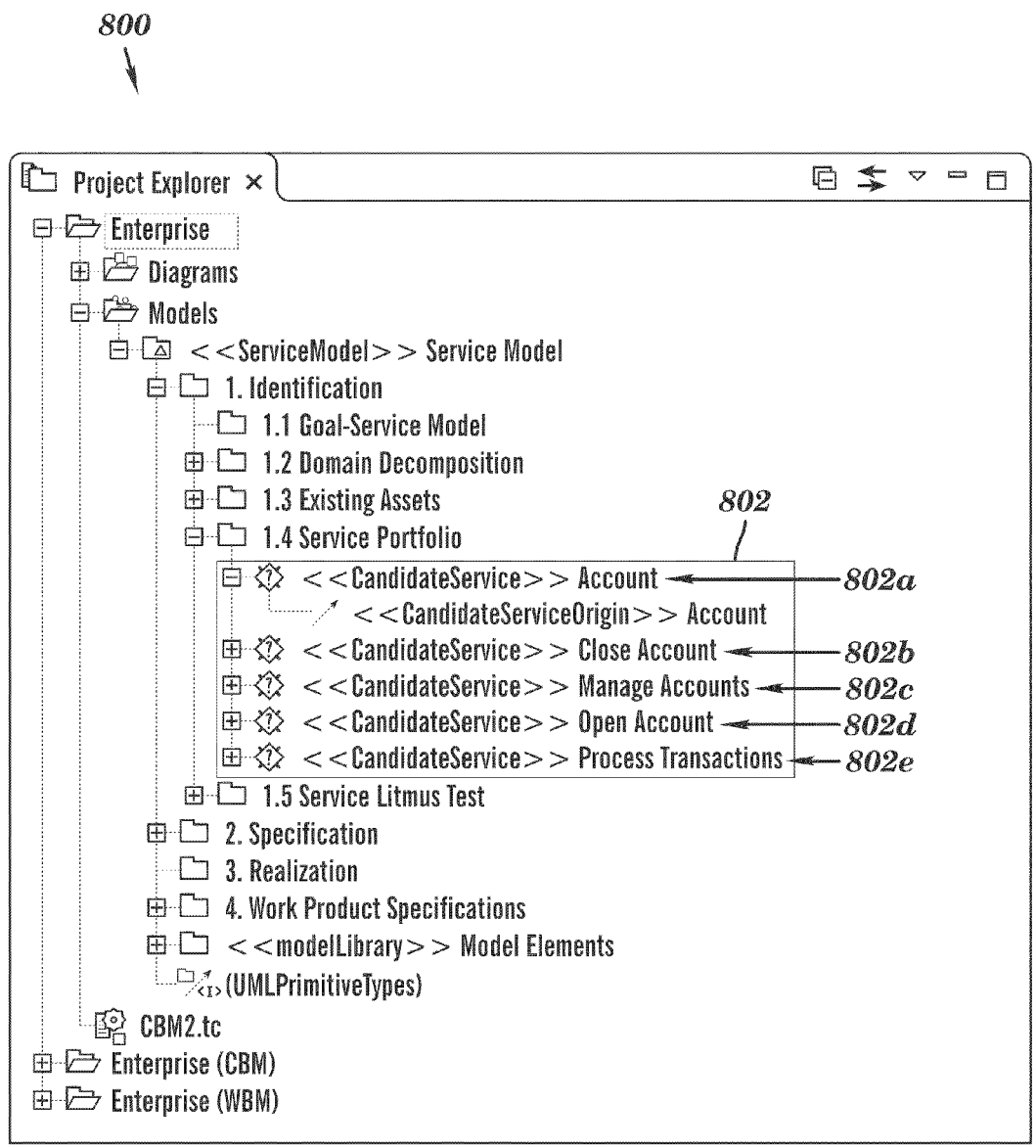
FIG. 8 illustrates a first screen shot of candidate services, in accordance with embodiments of the present invention.

FIG. 8 illustrates a screen shot 800 of candidate services 802 comprising an account service 702a, a close account service 702b, a manage accounts service 702c, an open account service 702d, and a process transactions service 702e, in accordance with embodiments of the present invention.

FIG. 9 illustrates a screen shot 900 of candidate services 902 moved under a service group account & policy administration 904 corresponding to a business component, in accordance with embodiments of the present invention. Candidate services comprise a manage accounts service 902a, an open account service 902b, a process transactions service 902c, and a close account service 902d.

FIG. 10 illustrates a screen shot 1000 of candidate services 1002, in accordance with embodiments of the present invention.

Figure 11:
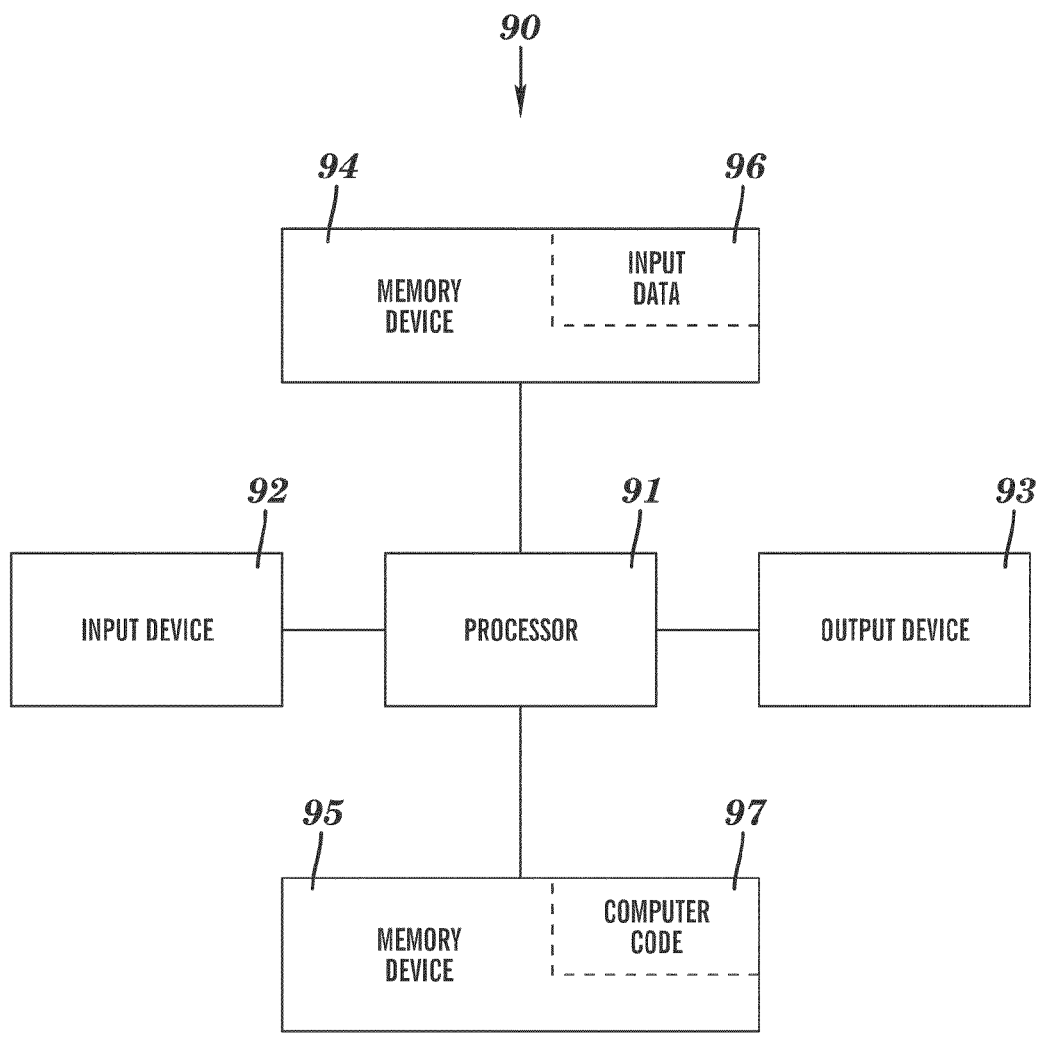
FIG. 11 illustrates a computer apparatus used for grouping and allocating services from a SOA service model, in accordance with embodiments of the present invention.

FIG. 11 illustrates a computer apparatus 90 (e.g., computing system 10 of FIG. 1) used for grouping and allocating services from a SOA service model, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 4) for grouping and allocating services from a SOA service model. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 11) may comprise the algorithms of FIGS. 2 and 4 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service provider who offers to group and allocate services from a SOA service model. Thus the present invention discloses a process for deploying, creating, integrating, hosting, and/or maintaining computing infrastructure, comprising integrating computer-readable code into the computer system 90, wherein the code in combination with the computer system 90 is capable of performing a method for grouping and allocating services from a SOA service model. In another embodiment, the invention provides a method that performs the process steps of the invention on a subscription, advertising, and/or fee basis. That is, a service provider, such as a Solution Integrator, could offer to group and allocate services from a SOA service model. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 11 shows the computer system 90 as a particular configuration of hardware and software, any configuration of hardware and software, as would be known to a person of ordinary skill in the art, may be utilized for the purposes stated supra in conjunction with the particular computer system 90 of FIG. 11. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
   retrieving, by a computing system from a service oriented architecture (SOA) model, a list of candidate services;
   retrieving, by said computing system, service identification techniques data associated with said candidate services;
   identifying, by said computing system, process elements associated with first candidate services of said candidate services, wherein said first candidate services comprise a process decomposition service identification technique;
   first determining, by a computer processor of said computing system, if said computing system comprises first mapping data indicating relationships between said process elements and first associated functional areas;
   generating, by said computing system, results data of said first determining;
   storing, by said computing system, said results data;
   generating, by said computing system, a business component map between business components, said first associated functional areas and said process elements, wherein said process elements comprising processes and sub-processes, a task, and a group of services;
   analyzing, by said computing system, said business component map;
   generating, by said computing system based on results of said analyzing, a first map illustrating specified business processes associated with said SOA model;
   presenting, by said computing system to a user via a display device, a first specified screen illustrating said first map;
   generating, by said computing system based on results of said analyzing, a second map illustrating specified candidate services associated with said SOA model;
   presenting, by said computing system to said user via said display device, a second specified screen illustrating said second map;
   generating, by said computing system based on results of said analyzing, a third map illustrating said specified candidate services comprised by a service group; and
   presenting, by said computing system to said user via said display device, a third specified screen illustrating said third map.

2. The method of claim 1, wherein said first determining determines that said computing system comprises said first mapping data, and wherein said method further comprises:
   associating, by said computing system, said first candidate services with service groups corresponding to said first associated functional areas.

3. The method of claim 1, wherein said first determining determines that said computing system does not comprise said first mapping data, and wherein said method further comprises:
   second determining, by said computing system, if said computing system comprises second mapping data indicating relationships between parent elements of said process elements and second associated functional areas.

4. The method of claim 3, wherein said second determining determines that said computing system comprises said second mapping data, and wherein said method further comprises:
   associating, by said computing system, said candidate services with service groups corresponding to said second associated functional areas.

5. The method of claim 3, wherein said second determining determines that said computing system does not comprise said second mapping data, and wherein said method further comprises:
   third determining, by said computing system, if said computing system comprises third mapping data indicating relationships between said process elements and first associated business components.

6. The method of claim 5, wherein said third determining determines that said computing system comprises said third mapping data, and wherein said method further comprises:
   associating, by said computing system, said candidate services with service groups corresponding to said first associated business components.

7. The method of claim 5, wherein said third determining determines that said computing system does not comprise said third mapping data, and wherein said method further comprises:
   fourth determining, by said computing system, if said computing system comprises fourth mapping data indicating relationships between said parent elements of said process elements and second associated business components.

8. The method of claim 7, wherein said fourth determining determines that said computing system comprises said fourth mapping data, and wherein said method further comprises:
   associating, by said computing system, said candidate services with service groups corresponding to said second associated business components.

9. A process for supporting computer infrastructure, said process comprising providing at least one support service for at least one of creating, integrating, hosting, maintaining, and deploying computer-readable code in said computing system, wherein the code in combination with said computing system is capable of performing the method of claim 1.

10. A computer program product, comprising a computer readable storage device storing a computer readable program code, said computer readable program code configured to perform the method of claim 1 upon being executed by a processor of said computing system.

11. A computing system comprising a processor coupled to a computer-readable memory unit, said memory unit comprising a computer readable code configured to be executed by the processor to perform the method of claim 1.

12. A method comprising:
   retrieving, by a computing system from a service oriented architecture (SOA) model, a list of exposed services;
   identifying, by said computing system, candidate services associated with said exposed services;
   retrieving, by said computing system, service identification techniques data associated with said candidate services;
   identifying, by said computing system, process elements associated with first candidate services of said candidate services, wherein said first candidate services comprise a process decomposition service identification technique;

first determining, by a computer processor of said computing system, if said computing system comprises first mapping data indicating relationships between said process elements and first associated functional areas;

generating, by said computing system, results data associated with said first determining;

storing, by said computing system, said results data;

generating, by said computing system, a business component map between business components, said first associated functional areas and said process elements, wherein said process elements comprising processes and sub-processes, a task, and a group of services;

analyzing, by said computing system, said business component map;

generating, by said computing system based on results of said analyzing, a first map illustrating specified business processes associated with said SOA model;

presenting, by said computing system to a user via a display device, a first specified screen illustrating said first map;

generating, by said computing system based on results of said analyzing, a second map illustrating specified candidate services associated with said SOA model;

presenting, by said computing system to said user via said display device, a second specified screen illustrating said second map;

generating, by said computing system based on results of said analyzing, a third map illustrating said specified candidate services comprised by a service group; and presenting, by said computing system to said user via said display device, a third specified screen illustrating said third map.

13. The method of claim 12, wherein said first determining determines that said computing system comprises said first mapping data, and wherein said method further comprises:

allocating, by said computing system, said exposed services to service components corresponding to said first associated functional areas.

14. The method of claim 12, wherein said first determining determines that said computing system does not comprise said first mapping data, and wherein said method further comprises:

second determining, by said computing system, if said computing system comprises second mapping data indicating relationships between parent elements of said process elements and second associated functional areas.

15. The method of claim 14, wherein said second determining determines that said computing system comprises said second mapping data, and wherein said method further comprises:

allocating, by said computing system, said exposed services to service components corresponding to second associated functional areas.

16. The method of claim 14, wherein said second determining determines that said computing system does not comprise said second mapping data, and wherein said method further comprises:

third determining, by said computing system, if said computing system comprises third mapping data indicating relationships between said process elements and first associated business components.

17. The method of claim 16, wherein said third determining determines that said computing system does not comprise said third mapping data, and wherein said method further comprises:

fourth determining, by said computing system, if said computing system comprises fourth mapping data indicating relationships between said parent elements of said process elements and second associated business components.

18. The method of claim 17, wherein said fourth determining determines that said computing system comprises said fourth mapping data, and wherein said method further comprises:

allocating, by said computing system, said exposed services to service components corresponding to said second associated business components.

19. A computer program product, comprising a computer readable storage device storing a computer readable program code, said computer readable program code configured to perform the method of claim 12 upon being executed by a processor of said computing system.

* * * * *